United States Patent Office 2,822,047
Patented Feb. 4, 1958

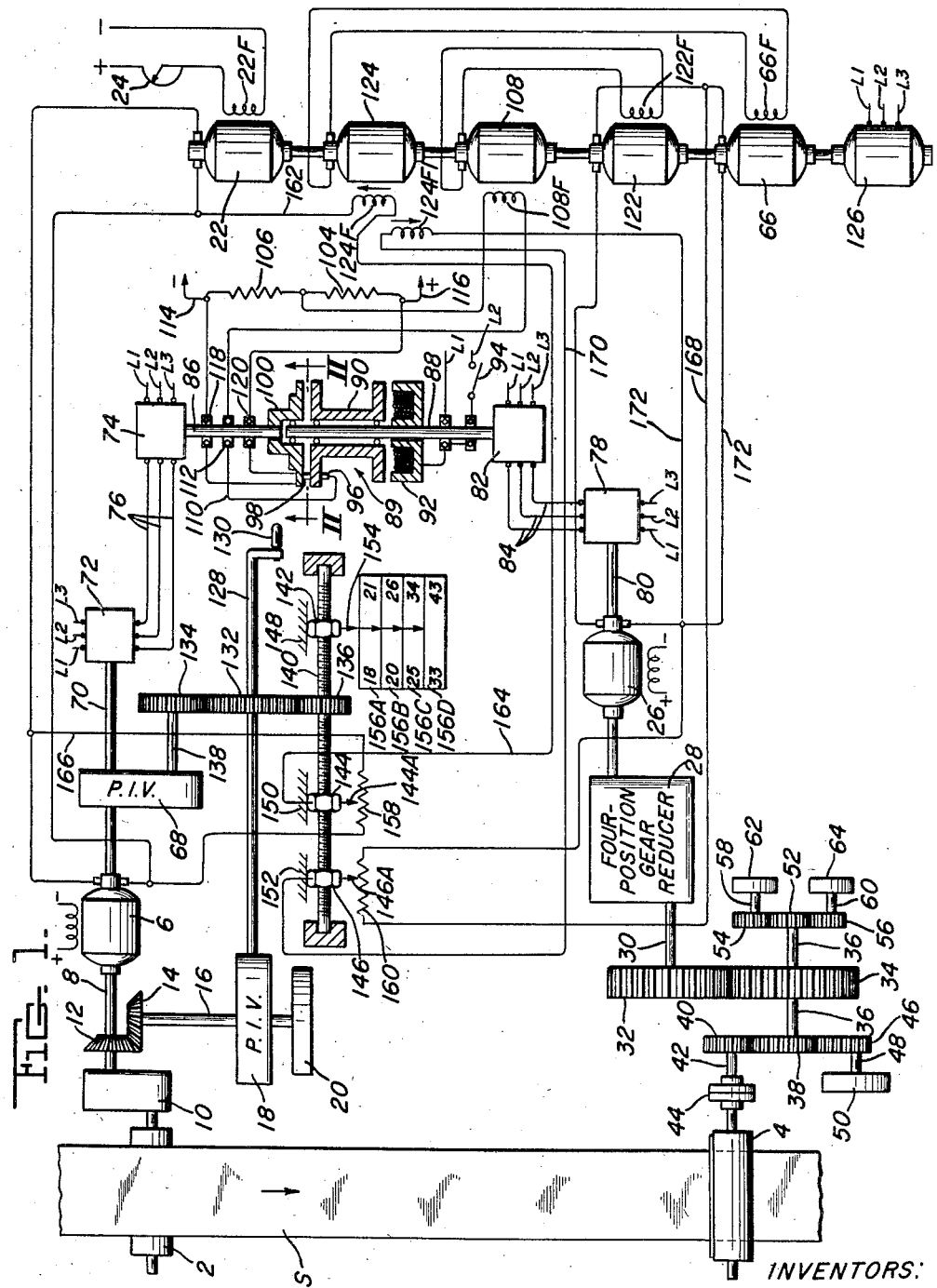

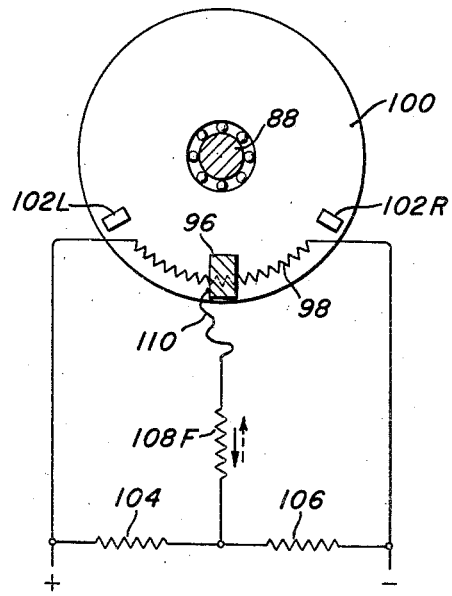
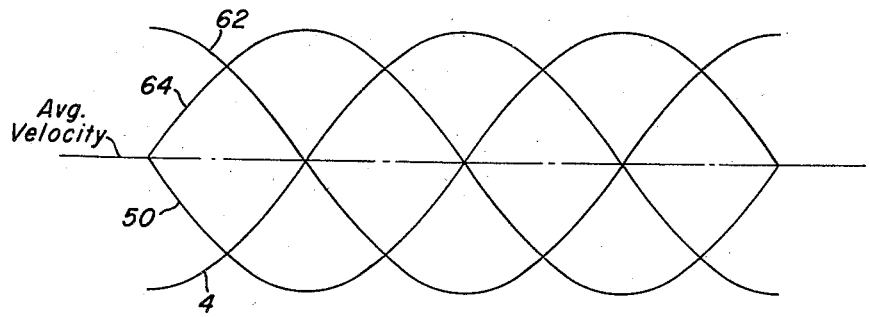

2,822,047

FLYING SHEAR

Howard S. Orr and George H. Rendel, Pittsburgh, Pa., assignors to United States Steel Corporation, a corporation of New Jersey Application January 26, 1955, Serial No. 484,198

4 Claims. (Cl. 164—68)

This invention relates to a flying shear and more particularly to a shear for cutting strip steel into sheets. A shear suitable for this purpose is shown in the patent to Hallden No. 2,180,202, dated November 14, 1939. While the shear shown therein is suitable for cutting sheets at relatively low speeds it is not suitable for cutting all lengths of sheets at high speeds such as 850 feet per minute and above. Shears of this type are used to cut sheets from strip electrolytically coated and the speed of the coating line cannot be greater than the speed at which the strip can be sheared into sheets accurately. In some instances in order to obtain greater coating speeds the strip is coiled and then sheared on a separate shear line but this increases the cost of shearing. The can manufacturing companies require sheets of tin plate varying from 18 to 42 inches in length with a tolerance of plus or minus $\frac{1}{16}$ inch. It is often impossible to obtain this tolerance on the present shears when operating at high speeds. In the present shears a single motor is used to drive the feed rolls and the cutter drums and a single fly wheel is used to counterbalance the surge of the shear drums. However, the arrangement is such that the surge is only partially balanced so that the shafts in the system are subjected to a complete torque reversal every 90° of rotation. As a result of this unbalance the operators insist on no backlash and tight fits which are impossible to maintain. When cutting sheets 20 inches long at 600 feet per minute the twists on the shafts, gears and mechanical parts are alternating 24 times a second. In order to provide for infinitely variable lengths of sheets an infinitely variable speed change unit such as shown in the Hallden patent is used. This unit is known as the "P. I. V." and is manufactured by the Link-Belt Company. Because the P. I. V. unit as used carries the load and is subject to the reversal of torque discussed above, it is not sufficiently accurate at high speeds. This further increases the error in sheet lengths. The kinetic energy of the drive between the motor and the measuring rolls is less than the kinetic energy of the drive between the motor and the knife drums so that an initial error is introduced into the system.

It is therefore an object of our invention to provide a flying shear which can accurately shear sheets at high speeds.

Another object is to provide such a shear in which the value of the maximum torque on the shafts is decreased.

Still another object is to provide such a shear in which the kinetic energy of the drives to the feed roll and the knife drum are balanced.

A still further object is to provide such a shear in which the two drives are isolated from one another.

These and other objects will be more apparent after referring to the following specification and attached drawings, in which:

Figure 1 is a schematic horizontal view of a shear line and its drives and controls;

Figure 2 is an enlarged schematic view taken on the line II—II of Figure 1 and showing a bridge circuit utilized in the controls; and Figure 3 is a velocity diagram of the cutter drum and fly wheels.

Referring more particularly to the drawings, reference numeral 2 indicates the measuring or feed rolls over which a strip S passes to a shear drum 4 in the usual manner. While only one feed roll and drum are shown it will be understood that several feed rolls may be used and that a cooperating shear drum is provided in the same vertical plane as drum 4. The measuring rolls 2 are driven from a motor 6 by means of a shaft 8 and a gear reducer 10. A beveled gear 12 is mounted on the shaft 8 and is in mesh with a beveled gear 14 which is mounted on shaft 16 for rotation therewith. A P. I. V. unit 18 and fly wheel 20 are also mounted on the shaft 16. Motor 6 receives power from a generator 22, the potential output of which is controlled by its field winding 22F which may be adjusted by means of a rheostat 24. The speed of the strip delivered from the measuring rolls is about proportional to the potential applied to motor 6 and in operation the strip speed is regulated by adjusting the potential output of generator 22. The shear drum 4 is rotated by means of a motor 26 through a 4-position gear reducer 28, shaft 30, spur gears 32 and 34, shaft 36, elliptical gears 38 and 40, shaft 42 and coupling 44. An elliptical gear 46 is in mesh with gear 38 and is mounted on a shaft 48 along with a fly wheel 50. In addition to the gears 34 and 38 an elliptical gear 52 is mounted on the shaft 36. Elliptical gears 54 and 56 are in mesh with gear 52 and are mounted on shafts 58 and 60, respectively. Fly wheels 62 and 64 are mounted on shafts 58 and 60, respectively. Gears 38, 40, 46, 52, 54 and 56 are focus rotated elliptical gears such as shown in the Hallden patent and are so arranged that the shear drum 4 and fly wheels 50, 62 and 64 are rotated 90° out of phase with one another. In other words, as shown in Figure 3, the velocity of drum 4 reaches its maximum at the same time that the velocity of fly wheel 62 is at a minimum, 90° later the velocity of fly wheel 50 will reach its maximum, after another 90° the velocity of fly wheel 62 will reach its maximum, and after still another 90° the velocity of fly wheel 64 will reach its maximum. While the speed curves are shown as symmetrical for ease of illustration in actual practice they are not symmetrical. The moment of inertia of fly wheels 50, 62, 64 and the cutting unit (all rotating members driven by shaft 42) are equal to each other. In one specific installation this reduces the maximum torque on drive shaft 30 from 2305 foot pounds when using one fly wheel to 435 foot pounds.

The motor 26 receives power from a generator 66 the potential output from which is controlled by its field winding 66F. The motor 6 through a P. I. V. unit 68 mounted on a shaft 70 rotates a servo-transmitter 72 which is electrically connected to a servo-receiver 74 through wires 76. Motor 26 drives a servo-transmitter 78 through a shaft 80. The servo-transmitter 78 is electrically connected to servo-receiver 82 through wires 84. Servo-transmitters 72 and 78 and servo-receivers 74 and 82 are energized from power source L1, L2 and L3. The servo-receiver 74 is connected for rotation with shaft 86 and servo-receiver 82 is connected for rotation with shaft 88. Shafts 86 and 88 are part of a rotating control 89 which also includes the following parts associated therewith. A hub 90 surrounds the shaft 88 and is free to rotate with respect to shaft 88 except when a magnetic slip clutch or coupling 92 energized. Power for energizing the clutch 92 is provided from lines L1 and L2 through a switch 94. The hub 90 carries a contact arm 96 which is adapted to contact a resistor 98 mounted on a base plate 100 which is keyed to the shaft 86 for rotation therewith. Stops 102R and 102L are mounted on base plate 100 adjacent the ends of a resistor 98 which is connected in a bridge circuit with resistors 104 and 106 and field winding 108F of a generator 108 which acts as a vernier regulator. One side of field winding 108F is connected by means of a wire 110 to contact arm 96 through brush 112 mounted on shaft 86. Power is supplied to the bridge circuit through leads 114 and 116 with power being delivered to the resistor 98 through brushes 118 and 120. Power from the generator 108 is delivered to field winding 122F of a buck boost generator 122. The potential output from generator 66 is automatically regulated by a voltage regulator or generator 124 which is provided with shunt field windings 124F and 124F1. Field winding 124F is connected in opposition to winding 124F1. The generators 22, 66, 108, 122 and 124 are rotated by means of a motor 126 to which power is supplied through lines L1, L2 and L3. A shaft 128 having a handle 130 is connected to the P. I. V. unit 18 and has a gear 132 keyed thereto. Gear 132 meshes with gears 134 and 136. Gear 134 is connected through a shaft 138 to the P. I. V. unit 68. The gear 136 is mounted on a threaded shaft 140 which while free to rotate cannot move axially. Nuts 142, 144 and 146 are threaded on shaft 140 and are held from rotation by means of guides 148, 150 and 152, respectively. Thus, the nuts 142, 144 and 146 will move axially when the shaft 140 rotates. A pointer 154 is mounted on the nut 142 and cooperates with scales 156A, 156B, 156C and 156D to indicate the length of the sheet being cut. Nut 144 carries a contact arm 144A which moves along potentiometer resistor 158. Nut 146 carries a contact arm 146A which moves along potentiometer resistor 160. A portion of the voltage from generator 22 is delivered to the field winding 124F through wires 162 and 164, contact arm 144A, resistor 158 and wire 166. A portion of the voltage from generator 66 is delivered to the winding 124F1 through wire 168, resistor 160, contact arm 146A and wires 170 and 172.

The operation of our device is as follows:

Assuming that it is desired to cut sheets 29 inches long with the strip S traveling at 1000 feet per minute, the 4-position gear reducer 28 is engaged in position three. The handle 130 is then rotated which adjusts P. I. V. unit 18 through shaft 128 so as to cause the fly wheel 20 to rotate at a speed where the kinetic energy of the fly wheel 20 and the measuring roll drive will match the kinetic energy of the shear drum drive including the fly wheels 50, 62 and 64. While the control system could operate without the gear reducer 28 it is very desirable to use the speed reducer in order to minimize the range of the speed and voltage required on motor 26 in relationship to motor 6. The reason for this is that the speed of the two motors can be synchronized with greater accuracy when the load, speed and kinetic energy of the drives are similar. Turning of the handle 130 also positions movable contact arms 144A and 146A on their respective potentiometers so as to provide the desired voltage to fields 124F and 124F1. At the same time P. I. V. unit 68 is adjusted to a value where the speed of the shaft 70 will correspond to the speed of shaft 80. The switch 94 is normally closed so that the clutch 92 will cause the hub 90 to rotate with shaft 88. The contact arm 96 will be positioned on the midpoint of resistor 98. The rheostat 24 is adjusted to apply the correct potential to the motor 6 to cause it to rotate the rolls 2 at a speed of 1000 feet per minute. As mentioned above the potentials on windings 124F and 124F1 are adjusted to the desired value by means of varying the position of arms 144A and 146A. This changes the potential output from generator 124 and excites field winding 66F to cause the generator 66 to deliver the required potential to motor 26 to cause it to rotate at a speed proportional to that of motor 6. When the voltage of generator 22 is increased or decreased to accelerate or decelerate the line to cause it to operate at speeds other than 1000 feet per minute the voltage regulator 124 will automatically increase or decrease the voltage of generator 66 proportionally. When sheets longer or shorter than 29 inches are to be cut movement of the handle 130 will cause the ratio to change. In other words, the control system will maintain the speeds of the measuring roll drive motor and shear drum drive motor at values approaching synchronism by regulating the voltage applied to motors 6 and 26. Due to load deviation on these two drives some speed variations will result unless corrective means are provided. When there are no load deviations the shafts 86 and 88 will rotate at the same speed with the condition of the bridge circuit being as shown in Figure 2. The ohmic resistance from the center of resistor 98 to the midpoint between the resistors 104 and 106 is the same value from the plus terminal as it is from the minus terminal so that no current will flow through field winding 108F. However, when the two drives deviate from exact synchronization the face plate 100 and hub 90 revolve at slightly different speeds with the result that contact arm 96 moves off-center on the resistor 98, the direction of movement depending on the direction of speed deviation. In case shear motor 26 is rotating too slowly contact arm 96 moves on resistor 98 toward the negative terminal and causes the current to flow in the direction of the dashed arrow in field winding 108F. This raises the voltage on generator 108 and applies a current through field winding 122F of buck-boost generator 122 in the direction required to raise the voltage output from generator 122 in the proper polarity to boost the voltage supplied by generator 66. This increases the armature voltage applied to motor 26 thus increasing its speed and causing movable contact arm 96 to move until it is positioned at the midpoint of resistor 98 at which time the speeds of shafts 86 and 88 will again be equal. If the shear motor 26 is rotating too fast contact arm 96 moves on resistor 98 toward the positive terminal and causes current to flow through field winding 108F in the direction of the solid arrow. This raises the voltage on regulator 124 and applies current through field winding 122F in the direction required to raise the voltage output from generator 122 in the proper polarity to buck the voltage supplied by generator 66. This decreases the armature voltage applied to motor 26, thus decreasing its speed. As the speed of motor 26 decreases movable contact arm 96 will move until it is positioned at the midpoint of resistor 98. Stops 102R and 102L prevent the movable contact arm 96 from moving past the end of the resistor 98. In some installations it may be preferred to omit generator 108 and connect the field winding 122F in the bridge circuit in place of field winding 108F.

When it is desired to cut sheets 19 inches in length gear reducer 28 is positioned in its first position and handle 130 is turned until pointer 154 is positioned over numeral 19 on scale 156A. This causes P. I. V. units 18 and 68 and contact arms 144A and 146A to move to the position where shafts 86 and 88 will be caused to rotate at the same speed. Any variations in speed between shaft 86 and 88 will be corrected in the manner described above. It will be seen that there is very little load on the shafts 70 and 80 and that the measuring roll drive and shear drum drive are balanced so that its is relatively easy to keep the motors 6 and 26 in synchronism.

While one embodiment of our invention has been shown and described it will be apparent that other adaptations and modifications may be made without departing from the scope of the following claims.

We claim:

1. A flying shear for cutting an elongated object into short lengths comprising a measuring roll over which the elongated object passes, a rotatable shear drum, a first motor for driving said roll, a second motor for driving said drum, a first fly wheel, a connection between said first motor and said first fly wheel including a variable speed change unit for varying the speed of said first fly wheel, a driving connection between said second motor and said drum including a variable speed gear reducer, a shaft, two elliptical gears mounted on said shaft, a first pair of elliptical gears driven by one of said first named elliptical gears, a second pair of elliptical gears driven by the other of said first named elliptical gears, a connection between one of said first pair of elliptical gears and said drum, a second fly wheel driven by the other of said first pair of elliptical gears, and a third and fourth fly wheel one driven by each of said second pair of elliptical gears, said drum and said second, third and fourth fly wheels being rotated 90° out of phase with one another, a first generator for supplying current to said first motor, a second generator for supplying current to said second motor, and means for maintaining a predetermined ratio between the voltage outputs of said generators.

2. A flying shear according to claim 1 in which the means for maintaining a predetermined ratio between the voltage outputs of said generators includes a first servo-transmitter, a connection between said first motor and said first servo-transmitter, a second servo-transmitter, a connection between said second motor and said second servo-transmitter, a first servo-receiver electrically connected to said first servo-transmitter, a second servo-receiver electrically connected to said second servo-transmitter, a shaft connected to said first servo-receiver, a shaft connected to said second servo-receiver, and means responsive to variations in speeds between said last named shafts for varying the voltage output to one of said motors.

3. A flying shear according to claim 1 in which the means for maintaining a predetermined ratio between the voltage outputs of said generators includes a first servo-transmitter, a connection between said first motor and said first servo-transmitter, a second servo-transmitter, a connection between said second motor and said second servo-transmitter, a first servo-receiver electrically connected to said first servo-transmitter, a second servo-receiver electrically connected to said second servo-transmitter, a shaft connected to said first servo-receiver, a shaft connected to said second servo-receiver, a hub mounted on one of said last named shafts for rotation therewith, an opposed base plate mounted on the other of said last named shafts for rotation therewith, a resistor mounted around a portion of the periphery of said base plate, a contact arm mounted on said hub adapted to contact said resistor, a generator having a field, a bridge circuit including said last named field and resistor, means on said base plate for limiting movement of said last named arm around the periphery of said base plate, and electrical means connecting the output of said last named generator to vary the speed of said second motor when the speeds of the last named shafts vary from one another.

4. A flying shear for cutting an elongated object into short lengths comprising a measuring roll over which the elongated object passes, a rotatable shear drum, a first motor for driving said roll, a second motor for driving said drum, a first fly wheel, a connection between said first motor and said first fly wheel including a variable speed change unit for varying the speed of said first fly wheel, a driving connection between said second motor and said drum including a variable speed gear reducer, a shaft, two elliptical gears mounted on said shaft, a first pair of elliptical gears driven by one of said first named elliptical gears, a second pair of elliptical gears driven by the other of said first named elliptical gears, a connection between one of said first pair of elliptical gears and said drum, a second fly wheel driven by the other of said first pair of elliptical gears, and a third and fourth fly wheel one driven by each of said second pair of elliptical gears, said drum and said second, third and fourth fly wheels being rotated 90° out of phase with one another, a first generator for supplying current to said first motor, a second generator for supplying current to said second motor, a field for said second generator, a voltage regulator for supplying current to said field, two oppositely connected fields for said voltage regulator, a circuit for supplying current from said first generator to one of said oppositely connected fields, a circuit for supplying current from said second generator to the other of said oppositely connected fields, two potentiometers one in the circuit of each of the two oppositely connected fields, a movable arm for each of said potentiometers, a first servo-transmitter, a connection between said first motor and said first servo-transmitter, a second servo-transmitter, a connection between said second motor and said second servo-transmitter, a second variable speed unit in one of said last named connections, means for changing the position of said variable speed units and movable arms according to the length of cut desired, a first servo-receiver electrically connected to said first servo-transmitter, a second servo-receiver electrically connected to said second servo-transmitter, a shaft connected to said first servo-receiver, a shaft connected to said second servo-receiver, a hub mounted on one of said last named shafts for rotation therewith, an opposed base plate mounted on the other of said last named shafts for rotation therewith, a resistor mounted around a portion of the periphery of said base plate, a contact arm mounted on said hub adapted to contact said resistor, a generator having a field, a bridge circuit including said last named field and resistor, means on said base plate for limiting movement of said last named arm around the periphery of said base plate, and electrical means connecting the output of said last named generator to vary the speed of said second motor when the speeds of the last named shafts vary from one another.

References Cited in the file of this patent
UNITED STATES PATENTS

| | | |
|---|---|---|
| 1,490,733 | Crosby | Apr. 15, 1924 |
| 2,025,315 | Stansbury | Dec. 24, 1935 |
| 2,180,203 | Hallden | Nov. 14, 1939 |
| 2,298,877 | Edwards et al. | Oct. 13, 1942 |
| 2,394,589 | Behrens | Feb. 12, 1946 |
| 2,531,834 | Sziklai | Nov. 28, 1950 |
| 2,634,811 | Schaelchlin | Apr. 14, 1953 |